United States Patent
Keshavaraj et al.

(10) Patent No.: US 7,737,058 B2
(45) Date of Patent: Jun. 15, 2010

(54) AIRBAG WITH FLAME RETARDANT MONOLITHIC COATING LAYER

(75) Inventors: Ramesh Keshavaraj, Peachtree City, GA (US); Kunquan Yu, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 198 days.

(21) Appl. No.: 12/009,939

(22) Filed: Jan. 23, 2008

(65) Prior Publication Data

US 2009/0186543 A1 Jul. 23, 2009

(51) Int. Cl.
*B32B 5/18* (2006.01)
(52) U.S. Cl. ..................................... 442/226
(58) Field of Classification Search ................. 442/168, 442/181, 218, 224, 226, 239; 383/3; 428/34.1, 428/34.3, 34.7, 36.1, 36.4, 36.91, 98, 102, 428/192, 193; 280/728.1, 730.1, 730.2
See application file for complete search history.

(56) References Cited

U.S. PATENT DOCUMENTS

| | | | |
|---|---|---|---|
| 6,169,043 B1 | 1/2001 | Li | 442/71 |
| 6,169,365 B1 | 1/2001 | Kubon et al. | 313/631 |
| 6,177,365 B1 | 1/2001 | Li | 442/71 |
| 6,177,366 B1 | 1/2001 | Li | 442/71 |
| 6,239,046 B1 | 5/2001 | Veiga et al. | 442/76 |
| 6,348,543 B1 | 2/2002 | Parker | 525/106 |
| 6,468,929 B2 | 10/2002 | Parker | 442/164 |
| 6,545,092 B2 | 4/2003 | Parker | 525/106 |
| 6,630,220 B1 | 10/2003 | Veiga | 428/102 |
| 6,641,686 B1 | 11/2003 | Veiga et al. | 156/73.1 |
| 6,734,123 B2 | 5/2004 | Veiga et al. | 442/149 |
| 6,770,578 B2 | 8/2004 | Veiga | 442/164 |
| 6,846,004 B2 | 1/2005 | Parker | 280/728.1 |
| 2005/0100692 A1 | 5/2005 | Parker | 428/34.1 |

*Primary Examiner*—Arti Singh-Pandey
(74) *Attorney, Agent, or Firm*—Cheryl J. Brickey

(57) ABSTRACT

Provided herein are specific coating compositions, which are used as a monolithic coating layer for airbags. Preferably, these coating compositions are comprised of urethanes, which are blended together, where at least one of the urethane components is inherently flame retardant and the other of which is a urethane with gas-retaining properties. The gas-retaining urethane may be characterized as having high tensile strength at break, high elongation at break, and a 100% modulus less than 2,000 p.s.i. The inherently flame retardant urethane is the result of a manufacturing process in which a halogenated diol is reacted with an isocyanate, resulting in the incorporation of halogens into the polyurethane backbone. The resulting coating compositions (that is, the blends of gas-retaining urethane and flame retardant urethane), when applied as a single layer to an airbag fabric, result in an airbag with good gas retention, flame retardance, anti-blocking properties, and aging stability.

15 Claims, 1 Drawing Sheet

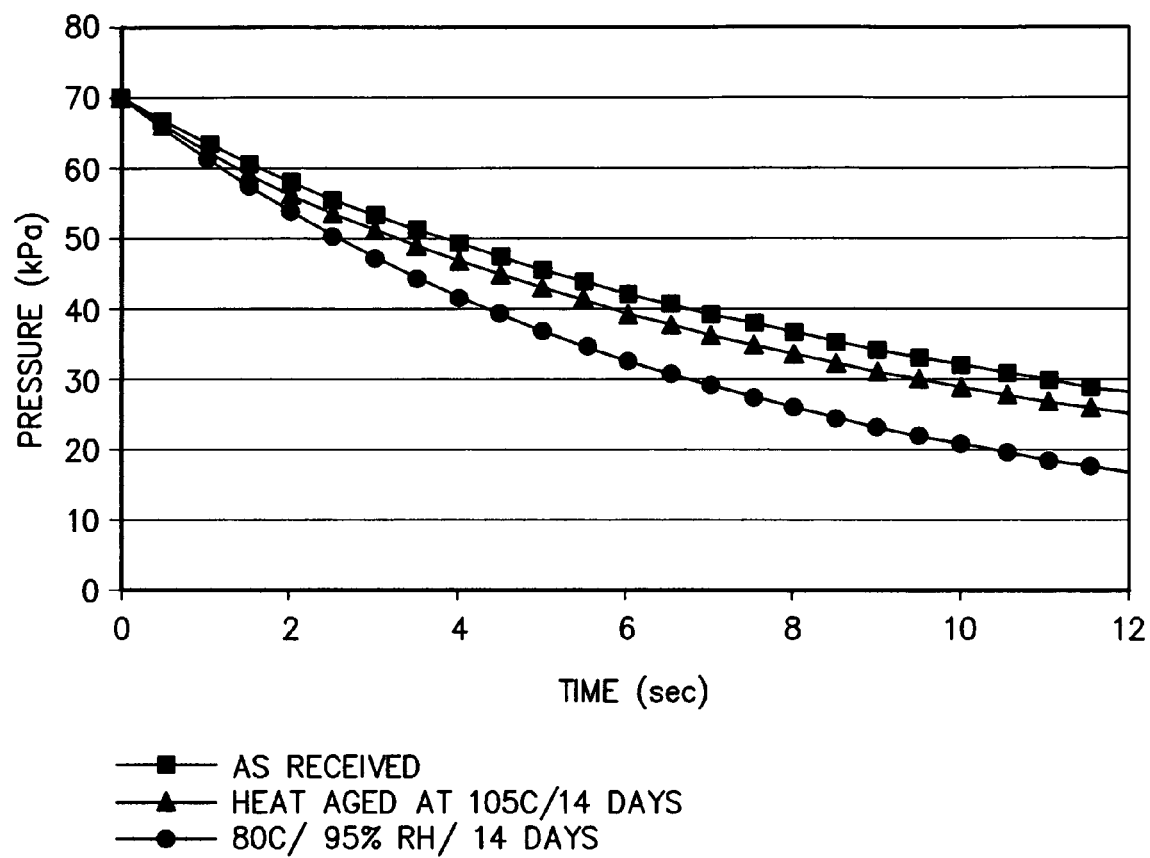
FIG. -1-

AIRBAG WITH FLAME RETARDANT MONOLITHIC COATING LAYER

TECHNICAL FIELD

The present disclosure relates to the use of a monolithic, flame-retardant coating for airbag fabrics. The flame retardant coating composition imparts desired properties to the airbag, such as gas retention, flame retardance, anti-blocking, and aging stability, which have heretofore been achievable only with multiple coating layers. The coating composition comprises a blend of at least two different urethanes, one of which is inherently flame retardant urethane and the other of which is a gas-retaining urethane compound. The primary advantage of the present coating composition is that, even when used as a single layer, it achieves the desired properties of a two-layer coating system.

BACKGROUND

Historically, airbags have been coated with one or more layers of polymeric material to enhance their performance, for example, by preventing the unwanted permeation of air through the fabric and, to a lesser extent, by protecting the fabric from detriment due to exposure to hot gases used to inflate the airbags. Polychloroprene was the polymer of choice in the early development of coated airbags. However, it was subsequently discovered that, when exposed to heat, polychloroprene tends to degrade and to release the components of hydrochloric acid, thereby potentially introducing hazardous chemicals into the surrounding and degrading the fabric component. This degradation issue, coupled with the desire to decrease the folded size of the completed airbag by using less coating material, led to the almost universal replacement of polychloroprene with silicone-based materials for use as airbag coatings.

Newer designs for airbags, particularly those being placed in the sides of passenger compartments, have introduced the requirement that the bags hold pressure longer under use. The requirement of longer air retention times and the use of lower coating levels of silicone polymer have highlighted the effect that a naturally lubricating silicone coating will allow the yarns in the airbag fabric to shift when a sewn seam is stressed. This shifting may lead to leakage of the inflating gas through pores formed from the shifting yarns or, in drastic cases, may cause the seam to fail. Since the airbag must retain its integrity during a collision event in order to sufficiently protect the vehicle occupants, there is a great need to provide coatings that provide both effective air retention characteristics and sufficient restriction of yarn shifting for the airbag to function properly.

As mentioned above, in recent years, silicone coatings have been utilized to provide such desired permeability and strength characteristics. Most often, these properties have been achieved by applying a first layer of gas-retaining polymer (such as a silicone-containing polymer) to the fabric surface and by applying a second, protective layer over the first layer. The second, protective layer prevents the airbag coating from sticking to itself when folded and stored (a condition known as "blocking") and also protects the first, gas-retaining layer from damage due to aging, abrasion, and the like. In most situations, the second layer also helps to minimize the burn rate of the airbag to achieve a passing score on the horizontal burn test mandated by Federal Motor Vehicle Safety Standard (FMVSS) 302.

Often, polymers including polyurethane, acrylics, and the like are used, either as components of a silicone layer (as in the case of blends, hybrids, or interpenetrating polymer networks) or as separate coating layers, perhaps with a silicone-containing layer. Efforts to create multi-component airbag coatings have previously focused on combining silicone with different polymers in the same polymer network. U.S. Pat. Nos. 6,348,543; 6,468,929; and 6,545,092, all to Parker, describe the production of an airbag coating made of a vinyl-containing polysiloxane cross-linked to, or admixed with, an ethylene-containing copolymer, such as ethylene methyl acrylate or ethylene vinyl acetate. In an alternate approach, described in U.S. Pat. No. 6,846,004 to Parker, a silicone polymer is combined with a copolymer of ethylene and at least one polar monomer in the presence of a volatile solvent and, optionally, a curing catalyst. Yet another approach, which is described in US Patent Application Publication No. 2005-0100692 to Parker, involves coating the airbag fabrics with the cross-linked reaction product of a vinyl-containing silicone and a copolymer having silicone and non-silicone substituents, which may or may not have terminal Si—H groups.

In the area of multiple-layered coating systems, U.S. Pat. Nos. 6,239,046 and 6,641,686, both to Veiga et al., describe the use of a two-layer airbag coating, where the fabric-contacting layer is an adhesive polyurethane and the top layer is an elastomeric polysiloxane. Another approach, described in U.S. Pat. No. 6,734,123 to Veiga et al., uses multiple layers of polyurethane as the airbag coating material. In this instance, layers of adhesive polyurethane and elastomeric polyurethane are employed to achieve the desired properties. Yet another multi-layer coating system is provided in U.S. Pat. No. 6,770,578 to Veiga, in which a prime coat of polyurethane is applied to an airbag fabric, followed by one or more layers of polymer film. Such polymer films are formed of polyurethane, polyamide, or polyolefin.

U.S. Pat. No. 6,177,365 and U.S. Pat. No. 6,177,366, both to Li, describe airbag coating compositions comprising at least two separate and distinct layers. The first layer (base coat), being in contact with the airbag surface, comprises a non-silicone composition of at least one coating material and provides excellent adhesion, excellent tensile strength, and lower cost than standard silicone materials. The second layer, being a coating for the first layer, provides excellent reinforcement and aging characteristics to prevent degradation of the first layer. Such a second layer (topcoat) is preferably a silicone material. This two-layer system permits excellent strength and aging properties to prevent seam combing at relatively low cost due to the inexpensive basecoat materials and the relatively low add-on weight required for the topcoat.

Airbag manufacturers have used these and other solutions to address the multiple problems associated with forming a suitable coating composition. Most importantly, the airbag coating needs to provide the necessary gas-retention properties to the airbag. Secondly, the coating needs to impart flame retardance to the airbag. Historically, this problem has been solved by incorporating flame retardant additives into the top layer(s) of the coating, since the incorporation of flame retardant additives into the fabric-contacting layer impairs gas retention. A third problem faced by manufacturers is that the coating compositions tend to stick to themselves, when the bags are folded and stored over long periods. This issue, known as "blocking", may cause the airbag coating to adhere to itself and pull away from the airbag as it is deployed. Finally, yet another problem is the need for the airbag coating to be stable to aging, meaning that the coating will not degrade over time and in extreme conditions of heat and/or humidity.

To date, no airbag manufacturers have been able to solve these problems with a single coating layer, which would be advantageous in terms of raw material and manufacturing costs. The present urethane-based coating composition, which may be used as a monolithic coating layer for airbags, provides a solution to these issues.

SUMMARY

Provided herein are specific coating compositions, which are used as a monolithic coating layer for airbags. Preferably, these coating compositions are comprised of urethanes, which are blended together, where at least one of the urethane components is inherently flame retardant and the other of which is a urethane with gas-retaining properties. The gas-retaining urethane may be characterized as having high tensile strength at break, high elongation at break, and a 100% modulus less than 2,000 p.s.i. The inherently flame retardant urethane is the result of a manufacturing process in which a halogenated diol is reacted with an isocyanate, resulting in the incorporation of halogens into the polyurethane backbone. The resulting coating compositions (that is, the blends of gas-retaining urethane and flame retardant urethane), when applied as a single layer to an airbag fabric, result in an airbag with good gas retention, flame retardance, anti-blocking properties, and aging stability.

BRIEF DESCRIPTION OF THE DRAWINGS

FIG. 1 is a graph showing the leak-down rates over time of airbags coated with the present coating composition as first produced and after two different aging tests.

DETAILED DESCRIPTION

Urethane Production

Two different urethanes are blended together, preferably in an aqueous dispersion, to produce the present coating composition.

The first urethane is engineered to produce excellent gas-retaining properties and, as such, will be referred to herein as the "gas-retaining urethane." The gas-retaining urethane is characterized as having high tensile strength at break (for instance, at least 2,500 p.s.i.), high elongation at break (for instance, at least 300%), and a 100% modulus less than 2,000 p.s.i. Typically, polycarbonate-based polyurethanes provide better gas retention properties than polyether- or polyester-based polyurethanes. In addition, polycarbonate-based polyurethanes tend to have the fewest degradation issues under normal airbag environmental (i.e., heat and humidity) aging conditions. It is also possible to use hybrids (that is, polyurethanes having both polycarbonate and polyether diols) for the gas-retaining urethane component.

The second urethane is an inherently flame retardant urethane and will be referred to herein as the "flame retardant urethane." The inherently flame retardant urethane is the result of a manufacturing process in which a halogenated diol is used as one of the starting materials, along with a polyol and an isocyanate. Advantageously, the inclusion of a halogenated compound (especially a brominated compound) in the urethane backbone eliminates the need for subsequently added flame retardant additives, which are often more difficult to incorporate into a coating composition. Preferably, the halogenated compound is a brominated polyol. Preferably, the brominated polyol is present in an amount of from about 10% to about 50% of the polyols used in making the flame retardant polyurethane. The flame retardant urethane is characterized as having a tensile strength greater than about 1,200 p.s.i.; more preferably, in the range of about 2,000 p.s.i. to about 2,500 p.s.i.; and, most preferably, greater than about 2,500 p.s.i.

The ratio of gas-retaining polyurethane to flame retardant polyurethane is preferably around between 80/20 and 50/50, by weight. In one embodiment, the ratio of gas-retaining polyurethane to flame retardant polyurethane is 70/30. In another, potentially preferred embodiment, the ratio of gas-retaining polyurethane to flame retardant polyurethane is 60/40. These ratios—each of which includes at least 50% of the gas-retaining polyurethane—ensure that the coating formulations exhibit a good balance of gas retention and flammability characteristics.

To produce the desired polyurethanes mentioned above, it is necessary to select the appropriate starting materials (one or more polyols, isocyanate, and chain extenders), molar ratios (especially the ratio of polyol to isocyanate), and reaction conditions. The molar ratio of polyol compound(s) to isocyanate compound is preferably on the order of 0.5:1 to 0.98:1.

Preferred polyols for producing a polyurethane include polycarbonate polyols, polyether polyols, silicon-based diols, olefin-based diols, polyester diols, and combinations thereof, the structures thereof being shown below as (I) through (VI). A single polyol may be used for the gas-retaining polyurethane, although two or more polyols may instead be used. By way of example only, and without limitation, blends of polycarbonate polyol and polyether polyol (e.g., in ratios of from about 80/20 to about 50/50, respectively) may be used to produce a gas-retaining polyurethane compound.

Polycarbonate polyols include compounds having a structure according to structures (I) and (II) below:

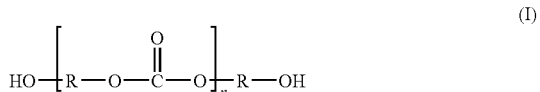

(I)

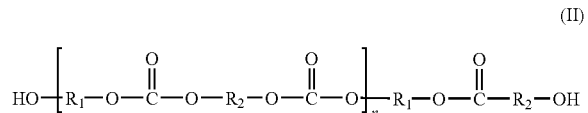

(II)

where R and $R_1$ are selected from the group consisting of aliphatic radicals and aromatic radicals, where $R_2$ is selected from the group consisting of aliphatic hydrocarbon groups having between 4 to 10 carbon atoms and alicyclic hydrocarbon groups having between 4 to 10 carbon atoms, and n is an integer between 2 and 20. In one embodiment, R is $(CH_2)_6$, resulting in a polycarbonate polyol with an average molecular weight $(M_n)$ of about 2,000.

Exemplary polyether polyols include compounds having a structure according to structure (III) below:

(III)

where n is an integer between 5 and 68. One representative polyether glycol is polypropylene glycol, having a molecular weight $(M_n)$ between 400 and 4,000. Also included in this class of polyols are olefin-based diols, which include compounds having a polyethylene, a polypropylene, or a polyolefin copolymer, where the copolymer has a hydroxyl group in a terminal and/or side chain position.

Exemplary silicon-based diols include compounds having a chemical structure according to structure (IV) below:

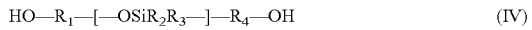

(IV)

where $R_1$ and $R_4$ are independently selected from the group consisting of aromatic and aliphatic radicals and where $R_2$ and $R_3$ are independently selected from the group consisting of methyl radicals, hydroxyl radicals, phenyl radicals, and hydrogen.

Exemplary polyester-based diols include the two compounds whose chemical structures (V) and (VI) are shown below:

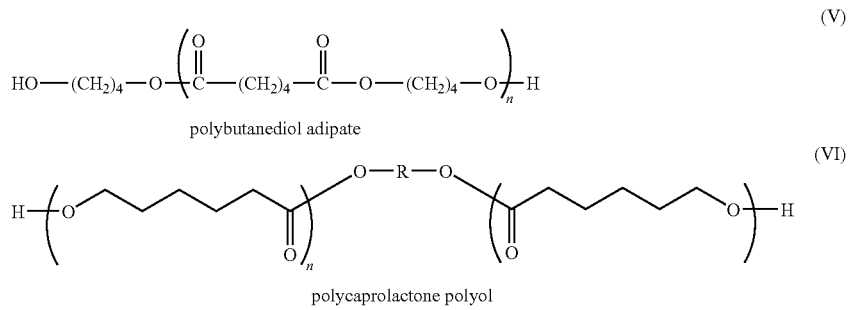

polybutanediol adipate (V)

polycaprolactone polyol (VI)

where R is selected from the group consisting of aliphatic hydrocarbon groups having between 2 and 10 carbon atoms and alicyclic hydrocarbon groups having between 2 and 10 carbon groups and where n is an integer chosen to provide a $M_n$ for the polyol of between about 1,000 and about 2,400.

Due to their color stability and heat stability, aliphatic isocyanates are preferred for reaction with the polyols described above. Suitable aliphatic isocyanates include, but are not limited to, 1,6-hexamethylene diisocyanate (HDI), isophorane diisocyanate (IPDI), hydrogenated methylenediphenyl diisocyanate (HMDI), and α,α,α',α'-tetramethyl-m-xylene diisocyanate (m-TMXDI).

In some circumstances, it may be desirable to use a catalyst to promote the reaction between the polymer diol and the isocyanate compound. Suitable catalysts include tertiary amines, organic tin compounds, and other catalysts known for this purpose.

Typically, water-based polyurethane dispersions are produced using a two-stage synthesis. The first stage involves the manufacture of a moderately low molecular weight, hydrophobic polyurethane oligomer having terminal isocyanate groups. This moderately low molecular weight oligomer is the reaction product of a multifunctional (usually difunctional) isocyanate with polyhydroxy compounds to produce an NH—COO urethane linkage. Such a reaction is shown below, where the polyol and the isocyanate are represented with generic structures. For water-based syntheses, at least one of the polyhydroxy compounds is ionic in nature, typically a dihydroxy organic acid, such as dimethylolpropionic acid (DMPA).

A representative reaction is shown below.

A wide variety of polyhydroxy compounds available for this synthesis reaction leads to the versatility of the polyurethane polymer. For example, in the production of an inherently flame retardant polyurethane, one of the polyhydroxy compounds is a halogenated polyhydroxy.

Due to the selective reactivity of the polyisocyanate, the acid functionality of the dihydroxy organic acid compound is extremely slow-reacting, as compared to primary or even secondary hydroxyl groups. This reactivity difference allows the reaction of the hydroxyl groups from the polyols—including the hydroxyl groups from dihydroxy organic acid—with excess polyisocyanate to yield the isocyanate-terminated polyurethane oligomer, shown above, which has a determinable amount of ionic functionality built within the oligomer backbone. As shown above, the ionic functionality is due to the presence of carboxylic acid groups. It should also be understood that compounds having sulfuric acid groups ($SO_3H$), in place of the carboxylic acid groups, may instead be used.

By combining one of a large array of polyhydroxy compounds and one of several choices of polyisocyanate compounds, there is the ability to tailor design performance characteristics to meet specific, required parameters, which may range from extremely low modulus with surface tack to low modulus with high tensile strength and elongation to high modulus with high tensile to extremely low elongation and brittleness. In the case of airbag coatings, it is desirable to provide a coating with relatively high tensile strength, high elongation, and low tack.

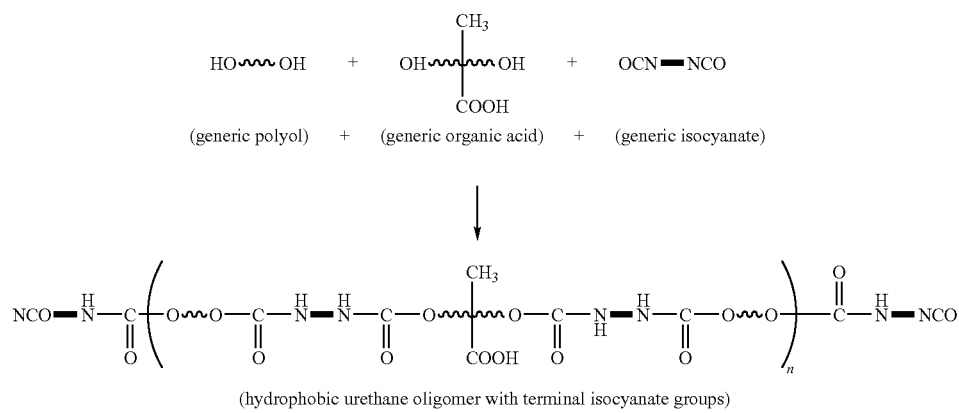

(hydrophobic urethane oligomer with terminal isocyanate groups)

The isocyanate-terminated polyurethane oligomer, shown above, is typically quite viscous. As a result, a dispersion solvent is needed to dilute the oligomer. Most often, N-methylpyrrolidone (NMP) is used for this purpose.

The second stage of the production of the desired polyurethane compounds involves complexing the ionic functionality, which is present in the hydrophobic (oil-based) oligomer, to create a water-dispersible (hydrophilic) urethane prepolymer. The hydrophilic urethane prepolymer may then be dispersed, under medium shear conditions. Typically, such complexing is achieved by introduction of a base, such as a volatile tertiary amine (represented as NEt$_3$ in the reaction shown below).

composition may include one or more of the following optional additives: thickeners, rheology modifiers, anti-blocking agents, colorants or pigments, heat or UV stabilizers, antioxidants, cross-linking agents, adhesion promoters, fillers, synergists for flammability, and the like. Preferably, rheology modifiers and thickeners are added to adjust the viscosity of the coating formulation to between about 25,000 and about 40,000 centipoise and, more preferably, to between about 30,000 and about 40,000 centipoise.

Some anti-blocking agents contribute both to the anti-blocking and flammability properties of the coating composition. Such compounds contain a high bromine content and

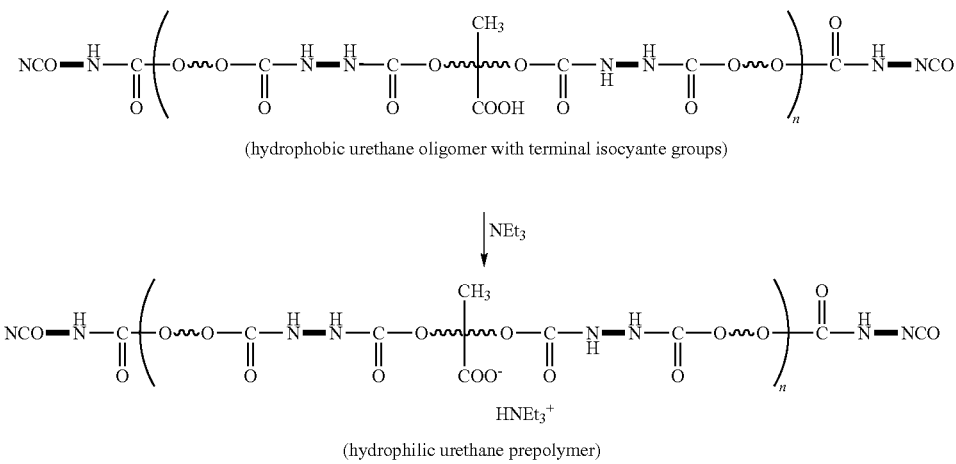

Stahl USA, Inc. of Peabody, Mass.; Bayer MaterialScience, LLC of Pittsburgh, Pa.; and Hauthaway Corporation of Lynn, Mass. manufacture one or more commercially available gas-retaining urethanes, which are suitable for use in the present coating formulations. Additionally, Stahl USA, Inc. and Hauthaway Corporation also manufacture commercially available flame retardant urethanes, including, but not limited to, an aliphatic polycarbonate polyurethane that includes brominated polyols incorporated therein.

Additives

Once dispersed, the hydrophilic urethane prepolymers (shown above as the reaction product) are extended with a multifunctional amine compound, which quickly reacts with the terminal isocyanate groups to create polyurea linkages and to promote chain growth. In this manner, the molecular weight of the polyurethane resin is further increased. Multifunctional amine compounds include any organic molecule having at least two primary amine groups, such as ethylenediamine, hexamethylenediamine, hydrazine, and the like. Again, there is significant versatility in the types of amine compounds that may be used for this purpose, as the molecular weight of these compounds ranges from about 32 (for hydrazine) to over 3,000 (for polyetheramines). The amount of amine compound to be introduced is calculated based on the amount of isocyanate present in the hydrophobic urethane compound at the time of dispersion. Most often, the amine compounds are present in an amount of from about 75% to about 95%, by molar ratio, of the isocyanate compounds.

The coating compositions described herein are particularly suitable for coating airbag fabrics and airbags. The coating have a synergistic fire retardant effect when combined with the flame retardant polyurethane.

Synergists

Synergists are compounds that enhance some characteristic of the components of the airbag coating formulations. The desired amount of synergist(s) may be incorporated into the urethane during the chain-extension stage, as the urethane is being dispersed, or may be post-added into the urethane dispersion once the urethane is manufactured.

Some synergists are of the flame retardant variety. Many of these flame retardant synergists do not exhibit significant flame retardant properties when used alone. However, when used with flame retardant urethanes, these synergists increase the overall effectiveness of the flame retardant coating composition, even when present in amounts as small as from about 5% to about 10% by weight of the coating composition.

In flame retardant coating formulations, the use of metal oxides as synergists in organohalogen systems is quite common. Of these, three oxides have been found to be especially useful. These are antimony trioxide (ATO), antimony pentoxide (APO), and sodium antimonite.

Application to Airbag Fabrics

As described herein, each of the two polyurethane compounds is synthesized according to the reactions shown above; converted into its hydrophilic prepolymer; dispersed in water with surfactants, defoamers, and other agents, as necessary or desired; and extended to the desired molecular weight. The two separate dispersions (that is, the gas-retaining polyurethane dispersion and the flame retardant polyurethane dispersion) are then combined, via shear mixing, to create a blended coating composition. The appropriate ratios of gas-retaining to flame retardant polyurethane and the appropriate amounts of optional additives are described above.

The coating composition, comprising the two urethane components and additives, is then applied to an airbag fabric by any known coating methods, including floating knife coating, knife-over-roll coating, spray coating, impregnation coating, curtain coating, reverse roll coating, transfer roll coating, and screen coating. The coating is then dried at a temperature in the range from about 260° F. to about 320° F. (from about 127° C. to about 160° C.) and, more preferably, at a temperature of about 300° F. (about 149° C.) for about two minutes. The add-on weight of the coating composition, when dry, is preferably from about 0.5 oz/yd$^2$ to about 1.5 oz/yd$^2$; more preferably, is less than about 1.0 oz/yd$^2$ (or 34 g/m$^2$); and, in some embodiments, may be less than about 0.6 oz/yd$^2$ (or 20 g/m$^2$).

Because the coating composition is applied as a single, monolithic layer, manufacturing is significantly simplified. Rather than applying a first coating layer, drying it, applying a second layer, and drying it, the present compositions require a single application pass and a single drying pass.

Moreover, in those cases where anti-blocking characteristics are incorporated within the present coating composition, manufacturing may be further simplified, by eliminating the need for a separate application of an anti-blocking agent to the dried airbag coating. Anti-blocking characteristics may be achieved through the proper selection of the bulk properties of the flame retardant and gas retaining urethanes. However, the use of the present coating compositions in a monolithic layer does not preclude the separate application of an anti-blocking agent (such as spray talc), if desired, as such applications are not considered a separate, or second, coating layer.

Example 1

An airbag coating composition to be used as a monolithic layer was prepared using commercially available urethanes in a dry blend ratio of 60:40 gas-retaining urethane to flame retardant urethane. The components of the coating composition are provided below.

| Component | % Solids | Parts (Dry) | Parts (Wet) |
|---|---|---|---|
| Gas-retaining urethane | 40 | 60.00 | 150.00 |
| Flame retardant urethane | 35 | 40.00 | 114.29 |
| Anti-blocking agent | 60 | 5.00 | 8.33 |
| Rheology modifier | 25 | 2.30 | 9.20 |
| Pigment | 40 | 0.90 | 2.25 |

The finished coating composition had a viscosity of approximately 34,000 centipoise and was readily spreadable via floating knife coater. The coating composition was applied, using a floating knife coater, in a single layer to both outer sides of a one-piece Jacquard woven side curtain-type airbag. The airbag had a 52×50 construction and used 420 denier nylon 6,6 yarns in both the warp and fill directions.

The coated bag was then dried in an oven at a temperature of about 300° F. (about 149° C.) for about 2 minutes. The dry add-on weight of the coating composition (on each side of the airbag) was about 0.5 oz/yd$^2$ or 17 g/m$^2$. No talc or other anti-blocking agents were added to the coated bag.

Example 2

Comparative

A comparative Example was created in which two different coating layers were applied sequentially to an airbag fabric. The components of the various coating layers are shown below.

| Layer 1: Fabric-Containing Layer | | | |
|---|---|---|---|
| Component | % Solids | Parts (Dry) | Parts (Wet) |
| Gas-retaining urethane | 40 | 80.00 | 200.00 |
| Acrylic polymer | 60 | 20.00 | 33.33 |
| Rheology modifier | 15 | 2.00 | 13.33 |
| Pigment | 40 | 0.03 | 0.08 |

The fabric-contacting coating composition was applied, using a floating knife coater, in a single layer to both outer sides of a one-piece Jacquard woven side curtain-type airbag. The airbag had a 52×50 construction and used 420 denier nylon 6,6 yarns in both the warp and fill directions.

The coated fabric was then dried in an oven at a temperature of about 300° F. (about 149° C.) for about 2 minutes. The dry add-on weight of the first layer (on each side of the airbag) was about 0.5 oz/yd$^2$ or 17 g/m$^2$.

| Layer 2: Top-Coat Layer | | |
|---|---|---|
| Component | % Solids | Parts (Dry) |
| Silicone Component "Part A" | 100 | 50.00 |
| Silicone Component "Part B" | 100 | 50.00 |

The top-coat layer composition was applied, using a floating knife coater, over the fabric-contacting layer. The coated fabric was then dried a second time in an oven at a temperature of about 360° F. (about 182° C.) for about 1.5 minutes. The dry add-on weight of the second layer (on each side of the airbag) was about 1.0 oz/yd$^2$ or 34 g/m$^2$. The coated airbag fabric was then lightly sprayed with talc to prevent blocking.

Evaluation of Examples

Examples 1 and 2 were evaluated for a variety of properties, the results of such analyses being shown below. Where appropriate, standard test methods are listed in parentheses following the test descriptions.

| Description (Test Method) | Units | Example 1 | Example 2 |
|---|---|---|---|
| Weave Count - Warp (ISO7211/2 Method C) | Per 25.4 mm | 51.0 | 52.3 |
| Weave Count - Fill (ISO7211/2 Method C) | Per 25.4 mm | 50.0 | 50.3 |
| Total Weight A (ASTM D-3776C) | oz/yd$^2$ | 6.5 | 7.6 |
| Coating Add-on "A" Side | g/m$^2$ | 13.6 | 51.2 |
| Total Weight B (ASTM D-3776C) | oz/yd$^2$ | 6.5 | 7.6 |
| Coating Add-on "B" Side | g/m$^2$ | 13.0 | 49.6 |
| Tensile - Warp (ASTM D-5034) | N | 2576 | 2540 |
| Tensile - Fill (ASTM D-5034) | N | 2716 | 2654 |
| Elongation - Warp (ASTM D-5034) | % | 45.1 | 45.8 |

-continued

| Description (Test Method) | Units | Example 1 | Example 2 |
|---|---|---|---|
| Elongation - Fill (ASTM D-5034) | N | 43.9 | 48.2 |
| Joint Tensile - Warp (ASTM D-1683) | N | 1542 | 1474 |
| Joint Tensile - Fill (ASTM D-1683) | N | 1403 | 1466 |
| Tongue Tear Strength - Warp (ASTM D-2261) | N | 134 | 180 |
| Tongue Tear Strength - Fill (ASTM D-2251) | N | 144 | 206 |
| Flammability - Warp (FMVSS 302) | Pass/Fail | Pass | Pass |
| Flammability - Fill (FMVSS 302) | Pass/Fail | Pass | Pass |
| Stiffness/Circular Bend - Warp (ASTM D-4032) | N | 14.0 | 11.6 |
| Stiffness/Circular Bend - Fill (ASTM D-4032) | N | 12.7 | 11.0 |

These results indicate that the monolithic coating composition of the present disclosure performs equally well as the standard, two-layer coating composition, in terms of flammability and tensile strength. Importantly, the present monolithic coating was able to meet flammability requirements without the necessity of a second (top) coat to provide flame retardance.

As described previously, gas retention is important in protecting a vehicle's occupants from injury, especially in the event of a vehicle rollover. Gas retention is measured by inflating an airbag (in this case, a side-curtain, one-piece woven airbag) to a peak pressure of 70 kPa and then recording the pressure retention as a function of time. The time for deflation was measured and has been plotted in FIG. 1. FIG. 1 shows the gas retention rates for three airbags of the same construction (materials, size, shape, and volume), which were coated with the formulation of Example 1.

A first airbag was tested immediately after production (as indicated in FIG. 1 by the label "As Received" and with a line comprised of square-shaped points).

A second airbag was subjected to environmental testing by heat-aging the coated airbag at 105° C. for 14 days (as indicated in FIG. 1 by the label "Heat Aged at 105 C/14 Days" and with a line comprised of triangle-shaped points).

A third airbag was subjected to environmental testing by subjecting the coated airbag to a temperature of 80° C. and 95% relative humidity for 14 days (as indicated in FIG. 1 by the label "80 C/95% RH/14 Days" and with a line comprised of circular points).

As shown in the FIGURE, the elimination of the second (top) coating layer from the airbag coating system had no effect on the airbags coated with the present coating system. Even after vigorous environmental testing, the gas-retaining properties of the present coating system are not significantly reduced. The gas-retaining properties remain substantially the same (and in an acceptable range) as the "As Received" sample.

Another test used to evaluate Examples 1 and 2 is called a "blocking test," which indicates the force required to separate two portions of coated fabric from one another after prolonged storage in contact with each other (such as an airbag is stored). This test was conducted in accordance with Test Method SAE J912, entitled "Test Method for Determining Blocking Resistance and Associated Characteristics of Automotive Trim Materials." The test method is designed to indicate the degree of surface tackiness, color transfer, loss of embossment, and surface marring when two materials are placed face-to-face under specific conditions of time, temperature, and pressure.

Laboratory analysis for blocking entails cutting two 50 mm×75 mm swatches of airbag fabric, pressing a 50 mm×50 mm area under a 5 lb. (22 N) load at 100° C. for 48 hours, and allowing a 25 mm×50 mm end flap to remain without exposure to temperature or pressure. At the end of the testing period, the 22 N-load is removed and a 50-gram mass is attached to the end flap on the lower fabric swatch. The time required for the two coated swatches to peel apart completely is recorded. If the time required to separate the fabrics utilizing a 50-gram weight suspended from the bottom fabric layer is greater than 30 seconds, the coating system fails the blocking test.

Clearly, the lower the required separating shear force, the more favorable the coating. In traditional airbag coating systems (such as that of Example 2), to improve blocking resistance and thus reduce the chance of improper adhesion between the packed fabric portions, anti-blocking agents (such as talc, silica, silicate clays, and starch powders) may be applied to the coated fabric. However, the need for such additives is eliminated with the present coating compositions, as shown by the results obtained below.

| Sample Identification | Separation Time |
|---|---|
| Example 1 | Immediate |
| Example 2 (Comparative) | Immediate |

Thus, the single-layer, urethane-based coating system of Example 1 performed as well as the two-layer, talc-applied coating system of Example 2.

As demonstrated above and as described herein, the present single-layer coating systems described herein provide excellent gas retention, anti-blocking characteristics, flame retardance, and aging stability, making them advancements over previously developed coating systems that require two coating layers to achieve these properties.

We claim:

1. An airbag fabric having a monolithic coating layer applied to at least one surface thereof, said monolithic coating layer comprising (a) a gas-retaining urethane characterized by a tensile strength at break of at least 2,500 p.s.i., an elongation at break of at least 300%, and a 100% modulus less than 2,000 p.s.i.; and (b) a flame retardant urethane containing halogen atoms in the polymer backbone; wherein the dry parts ratio of (a) to (b) is from 50:50 to 80:20.

2. The airbag fabric of claim 1, wherein said gas-retaining urethane comprises a polyol selected from the group consisting of polycarbonate polyols, polyether polyols, silicon-based dials, polyester dials, and combinations thereof.

3. The airbag fabric of claim 2, wherein said gas-retaining urethane comprises a polycarbonate polyol.

4. The airbag fabric of claim 1, wherein said halogen atoms in said flame retardant urethane originate in a halogenated diol, said halogenated diol being present in an amount between about 10% and about 50% by weight of said flame retardant urethane.

5. The airbag fabric of claim 4, wherein said halogen atoms are bromine atoms.

6. The airbag fabric of claim 1, wherein said monolithic coating layer further comprises at least one additive selected from the group consisting of thickeners, rheology modifiers, anti-blocking agents, colorants, pigments, heat stabilizers, UV stabilizers, antioxidants, cross-linking agents, adhesion promoters, fillers, and synergists.

7. The airbag fabric of claim 6, wherein said monolithic coating layer further comprises a rheology modifier.

8. The airbag fabric of claim 6, wherein said monolithic coating layer further comprises a pigment.

9. The airbag fabric of claim 6, wherein said monolithic coating layer further comprises a synergist.

10. The airbag fabric of claim 9, wherein said synergist is selected from the group consisting of antimony trioxide, antimony pentoxide, and sodium antimonite.

11. The airbag fabric of claim 1, wherein the dry add-on weight of said monolithic coating layer is from about 0.5 oz/yd$^2$ to about 1.5 oz/yd$^2$.

12. The airbag fabric of claim 11, wherein the dry add-on weight of said monolithic coating layer is from about 0.5 oz/yd$^2$ to about 1.0 oz/yd$^2$.

13. The airbag fabric of claim 12, wherein the dry add-on weight of said monolithic coating layer is from about 0.5 oz/yd$^2$ to about 0.6 oz/yd$^2$.

14. The airbag fabric of claim 1, wherein the dry parts ratio of (a) to (b) is 70:30.

15. The airbag fabric of claim 1, wherein the dry parts ratio of (a) to (b) is 60:40.

* * * * *

UNITED STATES PATENT AND TRADEMARK OFFICE
CERTIFICATE OF CORRECTION

PATENT NO. : 7,737,058 B2
APPLICATION NO. : 12/009939
DATED : June 15, 2010
INVENTOR(S) : Keshavaraj et al.

It is certified that error appears in the above-identified patent and that said Letters Patent is hereby corrected as shown below:

In column 12, line 54, after the word "silicon-based", delete the word "dials" and replace with -- diols --.

In column 12, line 54, after the word "polyester" delete the word "dials" and replace with the word -- diols --.

Signed and Sealed this

Fourteenth Day of September, 2010

David J. Kappos
*Director of the United States Patent and Trademark Office*